(12) United States Patent
Willing et al.

(10) Patent No.: US 11,962,065 B2
(45) Date of Patent: Apr. 16, 2024

(54) FOLDABLE ANTENNA

(71) Applicant: Dell Products L.P., Round Rock, TX (US)

(72) Inventors: Austin Willing, Austin, TX (US); Deeder M. Aurongzeb, Austin, TX (US); Johnny Gutierrez, Lake Hills, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/446,275

(22) Filed: Aug. 27, 2021

(65) Prior Publication Data

US 2023/0060719 A1    Mar. 2, 2023

(51) Int. Cl.
*H01Q 1/22* (2006.01)
*G06F 1/16* (2006.01)
*H01Q 9/04* (2006.01)
*H01Q 9/42* (2006.01)

(52) U.S. Cl.
CPC ......... *H01Q 1/2258* (2013.01); *G06F 1/1601* (2013.01); *G06F 1/1616* (2013.01); *G06F 1/1698* (2013.01); *H01Q 9/0421* (2013.01); *H01Q 9/42* (2013.01)

(58) Field of Classification Search
CPC .... H01Q 1/085; H01Q 1/2258; H01Q 1/2266; H01Q 1/243; H01Q 1/36; H01Q 1/38; H01Q 9/42; H01Q 9/0421; H01Q 13/206; H05K 1/0277; H05K 1/028; H05K 1/0393; H05K 1/118; H05K 1/147; H05K 2201/05; H05K 2201/10098; G06F 1/1601; G06F 1/1613; G06F 1/1615; G06F 1/1616; G06F 1/1633; G06F 1/1637

See application file for complete search history.

(56) References Cited

U.S. PATENT DOCUMENTS

| 7,443,352 B1 * | 10/2008 | Lin | H01Q 21/30 343/702 |
| 9,048,532 B2 * | 6/2015 | Yu | H01Q 5/371 |
| 9,627,754 B2 * | 4/2017 | Na | H01Q 9/42 |
| 2008/0074330 A1 * | 3/2008 | Lin | G06F 1/1698 343/702 |

(Continued)

FOREIGN PATENT DOCUMENTS

| CN | 112003019 A | * 11/2020 | ............... H01Q 1/22 |
| CN | 110518369 B | * 1/2021 | ............... H01Q 1/22 |

*Primary Examiner* — Ab Salam Alkassim, Jr.
*Assistant Examiner* — Leah Rosenberg
(74) *Attorney, Agent, or Firm* — Norton Rose Fulbright US LLP

(57) ABSTRACT

A flexible antenna may be used to transmit information from and receive information to an information handling system by folding the antenna into contact with an inside surface of a display chassis of the information handling system, an outside surface of the display chassis and the surface connecting them. The folded antenna configuration may permit the antenna to receive and transmit signals in any or almost any direction when the chassis (e.g., a laptop) is in an open position even though the antenna occupies only a very small space of the inside surface of the display chassis (i.e., permitting the screen to occupy nearly all of the inside surface of the display chassis without interference from the antenna) or in a closed position.

18 Claims, 6 Drawing Sheets

(56) References Cited

U.S. PATENT DOCUMENTS

| | | | |
|---|---|---|---|
| 2010/0231461 A1* | 9/2010 | Tran | H01Q 1/20 343/702 |
| 2011/0043408 A1* | 2/2011 | Shi | H01Q 1/48 343/700 MS |
| 2014/0197996 A1* | 7/2014 | Yonei | H01Q 9/0421 343/700 MS |
| 2014/0340265 A1* | 11/2014 | Vazquez | H01Q 1/243 343/702 |

\* cited by examiner

FOLDABLE ANTENNA

FIELD OF THE DISCLOSURE

The instant disclosure relates to information handling systems. More specifically, portions of this disclosure relate to an antenna of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Within the field of information handling systems, there is a desire to wirelessly transmit information from and receive information to the information handling system. This is typically performed using one of more antennas positioned on an inside surface of an information handling system chassis, such as adjacent to the screen of a laptop. These antennas can only be used to transmit and receive information when such inside surface is exposed (e.g., when a laptop is open). These antennas also restrict the size of the screen on such inside surface because the screen cannot be placed behind them without obstructing part of the screen from view.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

As described more fully in this disclosure, a flexible antenna may be used to transmit information from and receive information for an information handling system by folding the antenna into contact with an inside surface of a display chassis of the information handling system, an outside surface of the display chassis and the surface connecting them. For example, the display chassis may be a chassis housing the electronic display of a laptop. The folded antenna configuration may permit the antenna to receive and transmit signals in any or almost any direction when the chassis (e.g., a laptop) is in an open position even though the antenna occupies only a very small space of the inside surface of the display chassis (i.e., permitting the screen to occupy nearly all of the inside surface of the display chassis without interference from the antenna). Similarly, such folded antenna may receive and transmit signals in any or almost any direction when the chassis is in a closed position, which may be beneficial if, for example, the connecting side includes an electronic display that may display such received information to, for example, a user even when the chassis (e.g., laptop) is in a closed position. The folded antenna may also have superior performance at certain signal frequency ranges to an identical antenna that is not folded.

According to an embodiment of the disclosure, there is an apparatus comprising an antenna configured to be positioned across at least some portion of each of a first side, second side, and third side of a display chassis of an information handling system, wherein the third side of the display chassis connects the first side and second side, wherein the first side, second side, and third side are different sides, and wherein the antenna is configured to receive signals for or transmit signals from the information handling system. When the antenna is positioned across at least some portion of each of the first side, second side, and third side of the display chassis, the antenna may extend between 3 and 5 mm across the second side, for example, where the first side of the display chassis includes an electronic display. The antenna may be, for example, an F-antenna and the F-antenna may have a first branch positioned on the second side of the display chassis and a second branch positioned on the third side of the display chassis. The F-antenna may further have a third branch positioned on the first side of the display chassis.

According to an embodiment of the disclosure, an information handling system may comprise a display chassis having a first side, second side, and third side connecting the first side and second side; an antenna positioned across at least some portion of each of the first side, second side, and third side of the display chassis, the antenna being configured to receive signals for or transmit signals from the information handling system; and a flexible substrate positioned across at least some portion of each of the first side, second side, and third side of the display chassis, the flexible substrate configured to couple the antenna to the display chassis; wherein the first side, second side, and third side are different sides. The antenna may be printed onto the flexible substrate and may be an integral structure (i.e. with itself). The flexible substrate may be made of plastic and/or the antenna may be positioned between the flexible substrate and the display chassis. In some embodiments, the antenna may extend between 3 and 5 mm across the second side, for example, when the first side of the display chassis includes an opening for an electronic display. The system may further include an electrical connection between the antenna and a power supply and/or a network card (e.g., to receive signals to or transmit signals from) the information handling system through the second or third side of the display chassis, for example, when the first side of the display chassis includes an electronic display. In some embodiments, the antenna may be a F-antenna having a first branch positioned on the second side of the display chassis and a second branch positioned on the third side of the display chassis. In some embodiments, the antenna has a third branch positioned on the first side of the display chassis.

According to an embodiment of the disclosure, a method exists comprising coupling an antenna to a flexible substrate (e.g., by printing the antenna onto the flexible substrate); and coupling the flexible substrate to a display chassis of an information handling system (e.g., with the antenna positioned between the flexible substrate and the display chassis) such that the flexible substrate and antenna each at least partially span a first side, second side, and third side of the display chassis, wherein the third side of the display chassis connects the first side and the second side, and wherein the first side, second side and third side are different sides. In some embodiments, the method includes coupling the antenna to a display chassis of the information handling system such that the antenna extends between 3 and 5 mm across the second side, for example, when the first side of the display chassis includes an electronic display. In some embodiments, the method includes electrically connecting the antenna to the information handling system such that the antenna can receive signals to or transmit signals from the information handling system. In some embodiments, the method includes electrically connecting the antenna to the information handling system by an electric connection through the second or third side of the display chassis, for example, when the first side of the display chassis includes an electronic display.

As used herein, the term "coupled" means connected, although not necessarily directly, and not necessarily mechanically; two items that are "coupled" may be unitary with each other. When referring to coupling to an "end" of a component, this includes coupling to an "end portion" of the component. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings. Elements within each FIGURE are generally drawn to scale relative to other elements in the same FIGURE.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

Figure 1:
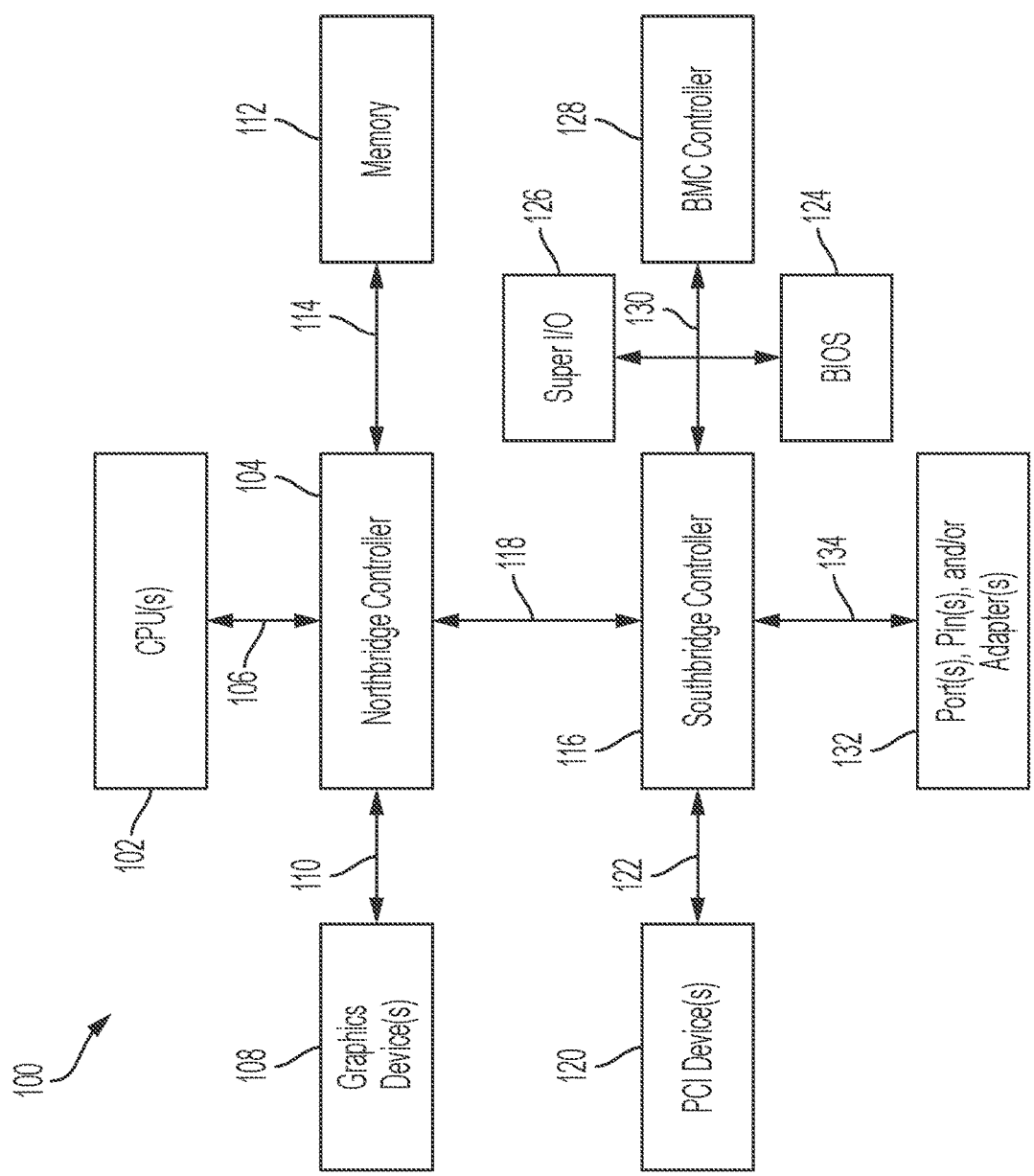
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

IHS 100 may be configured to access different types of computer-accessible media separate from memory 112. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 100 through various interfaces, such as universal serial bus (USB) interfaces, via northbridge controller 104 and/or southbridge controller 116. Some such mediums may be coupled to the IHS through a Super I/O Controller 126 combines interfaces for a variety of lower bandwidth or low data rate devices. Those devices may include, for example, floppy disks, parallel ports, keyboard and mouse and other user input devices, temperature sensors, and/or fan speed monitoring.

BIOS 124 may include non-volatile memory having program instructions stored thereon. The instructions stored on the BIOS 124 may be usable by CPU(s) 102 to initialize and test other hardware components. The BIOS 124 may further include instructions to load an Operating System (OS) for execution by CPU(s) 102 to provide a user interface for the IHS 100, with such loading occurring during a pre-boot stage. In some embodiments, firmware execution facilitated by the BIOS 124 may include execution of program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and/or manage BMC controller 128. Further, the BMC controller 128 may allow a user to setup configuration options, resolve and administer hardware or software problems, etc. Additionally or alternatively, BMC controller 128 may include one or more firmware volumes, each volume having one or more firmware files used by the BIOS firmware interface to initialize and test components of IHS 100.

One or more of the devices or components shown in FIG. 1 may be absent, or one or more other components may be added. Further, in some embodiments, components may be combined onto a shared circuit board and/or implemented as a single integrated circuit (IC) with a shared semiconductor substrate. For example, northbridge controller 104 may be combined with southbridge controller 116, and/or be at least partially incorporated into CPU(s) 102. Accordingly, systems and methods described herein may be implemented or executed with other computer system configurations. In some cases, various elements shown in FIG. 1 may be mounted on a motherboard and enclosed within a chassis of the IHS 100. For example, elements shown in FIG. 1 may include an antenna and electronic display mounted on a display chassis of the IHS 100 chassis.

Figure 2:
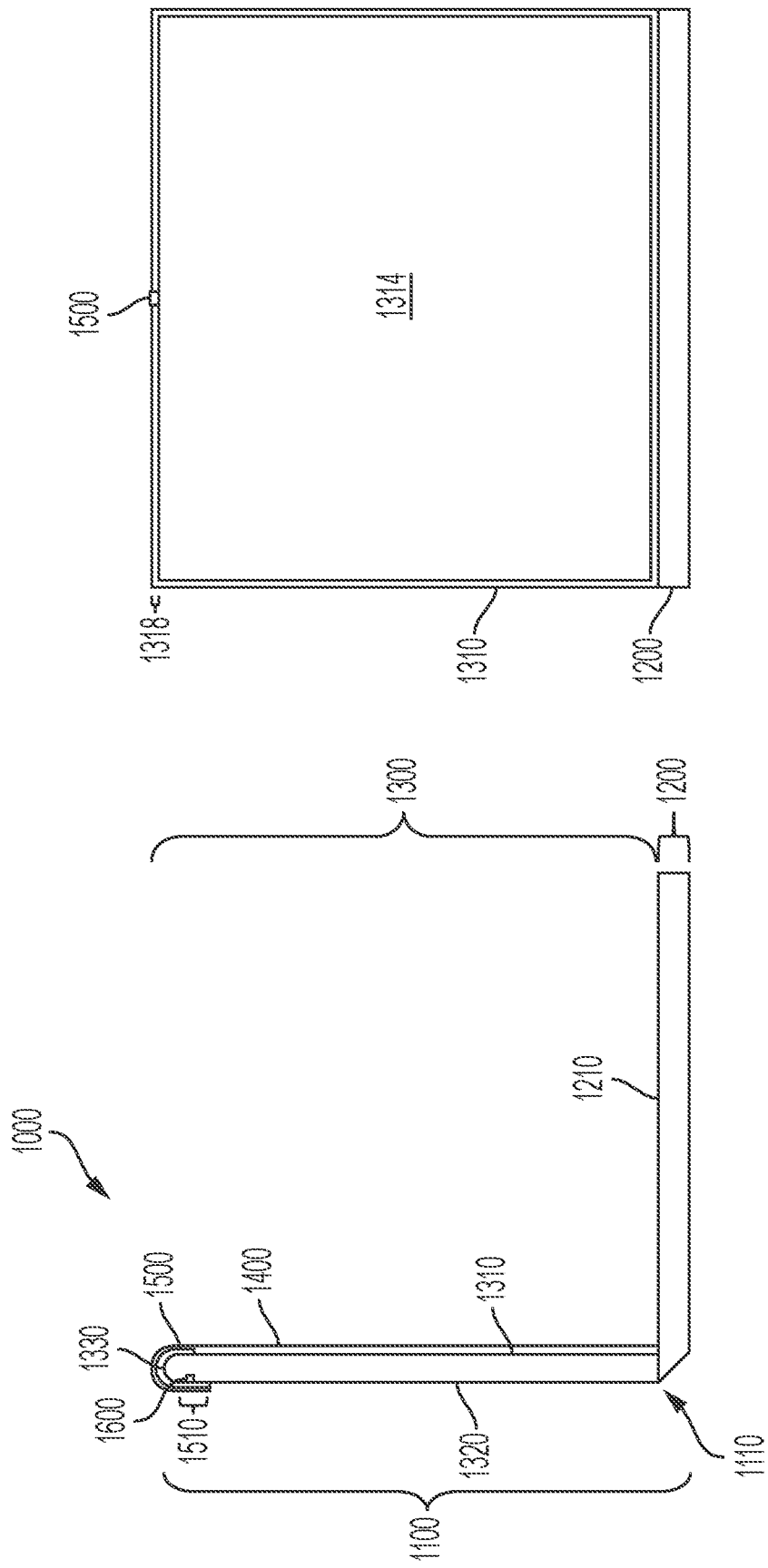
FIGS. 2A and 2B are a side and front view, respectively, of an exemplary information handling system having a display chassis according to some embodiments of the disclosure.

FIGS. 2A and 2B depict a chassis 1100 of an IHS 1000, such as IHS 100, having a primary chassis 1200 and display chassis 1300 in an "open" position. IHS 1000 may be, for example, a laptop. Primary chassis 1200 may house components of IHS 1000 such as some or most of the components described with reference to FIG. 1 above. Display chassis 1300 may house components of the IHS related to the electronic display of information as well as the wireless transmission and receipt of information (e.g., antennas for receiving and transmitting signals, for example, through Wi-Fi or cellular signals). In the embodiment of FIGS. 2A and 2B, display chassis 1300 includes a first side 1310, second side 1320, and curved third side 1330 that connects first side 1310 and second side 1320. First side 1310 may, for example, include an electronic display 1314 (see FIG. 2B; e.g., an LED or OLED display) for displaying electronic information to, for example, a user of IHS 1000. Second side 1320 may be made of protective material similar to, for example, the material of primary chassis 1200 to protect the components of IHS 1000 from damage, for example, during transport of IHS 1000. Third side 1330 may be made from the same or other protective material as second side 1320. Alternatively, second side 1320 may include an electronic display like or similar to the electronic display 1314 of first side 1310. Electronic display 1314 may cover substantially all (e.g., 95-99.9%, 96-99%, or 97-98%) of first side 1310 so that there is only a small border 1318 created by first side 1310 around electronic display 1314.

Display chassis 1300 may be coupled to primary chassis 1200 at a point 1110 that may, for example, permit articulation of the display chassis 1300 relative to the primary chassis 1200 such that the first side 1310 of display chassis 1300 may, for example, sit flush against and/or parallel to a first side 1210 of primary chassis 1200 when articulated about point 1110. When in this "closed" position, chassis 1100 may better protect IHS 1000, such as electronic display 1314, from damage and IHS 1000 may be more easily transported and stored. First side 1310 may be unviewable by a user when chassis 1100 is in this closed position. However, third side 1330, if it includes an electronic display may still display electronic information to, for example, a user when chassis 1100 is in this closed position.

A substrate 1400, such as a clear plastic cover (e.g., made of polycarbonate and, e.g., one side (e.g., the outside surface) being hard coated such that it is a low haze, anti-glare surface), may be positioned over the electronic display 1314 on first side 1310 to, for example, protect electronic display 1314 from damage. Substrate 1400 may include or be coupled to an antenna 1500 near a distal end located near third side 1330 (or alternatively near one or more of another of its edges). Antenna 1500 may, for example, be screen printed on the surface of substrate 1400 such that antenna 1500 contacts first side 1310, so that antenna 1500 is not physically accessible except after removing substrate 1400 from first side 1310. Either or both of substrate 1400 and antenna 1500 may be flexible (e.g., made from flexible materials such as, for example, for the substrate, thermoplastic, elastomer, PAI, COC, or composites with nanotubes (e.g., having ~2% filler) and, for the antenna, silver, silver nanowire, or graphene-scoped materials), so that substrate 1400 and/or antenna 1500 may be folded (e.g., have a substantially continuous radius of curvature) around and, for example, contact, each of the first side 1310, second side 1320, and third side 1330. For example, antenna 1500 may extend from a distal end located near third side 1330 (e.g., occupying only the top space of the small border 1318 as shown in FIG. 2B) around third side 1330 and extend a distance 1510 onto second side 1320 so that antenna 1500 may receive and/or transmit a signal in any or almost any direction (i.e., having a substantially omnidirectional radiation pattern with no nulls in the radiation pattern in directions with angles directed substantially away from IHS 1000), for example, when in an open position or closed position and even if there is only a small border 1318 created by first side 1310 around electronic display 1314. Distance 1510 may be any suitable distance sufficient to allow antenna 1500 to transmit or receive signals in any or almost any direction when chassis 1100 is in either an open or closed position. For example, distance 1510 may be between 1 mm and 10 mm, including between 3 mm and 4 mm or between 3 mm and 5 mm. Positioning antenna 1500 in the manner described may permit antenna 1500 to receive and transmit signals in any or almost any direction when chassis 1100 is in an open position even though antenna 1500 occupies only a very small space in border 1318 on first side 1310. Similarly, positioning antenna 1500 in the manner described may permit antenna 1500 to receive and transmit signals in any or almost any direction when chassis 1100 is in a closed position, which may be beneficial if, for example, third side 1330 includes an electronic display that may display such received information to, for example, a user even when the chassis 1100 is in a closed position.

Figure 3:
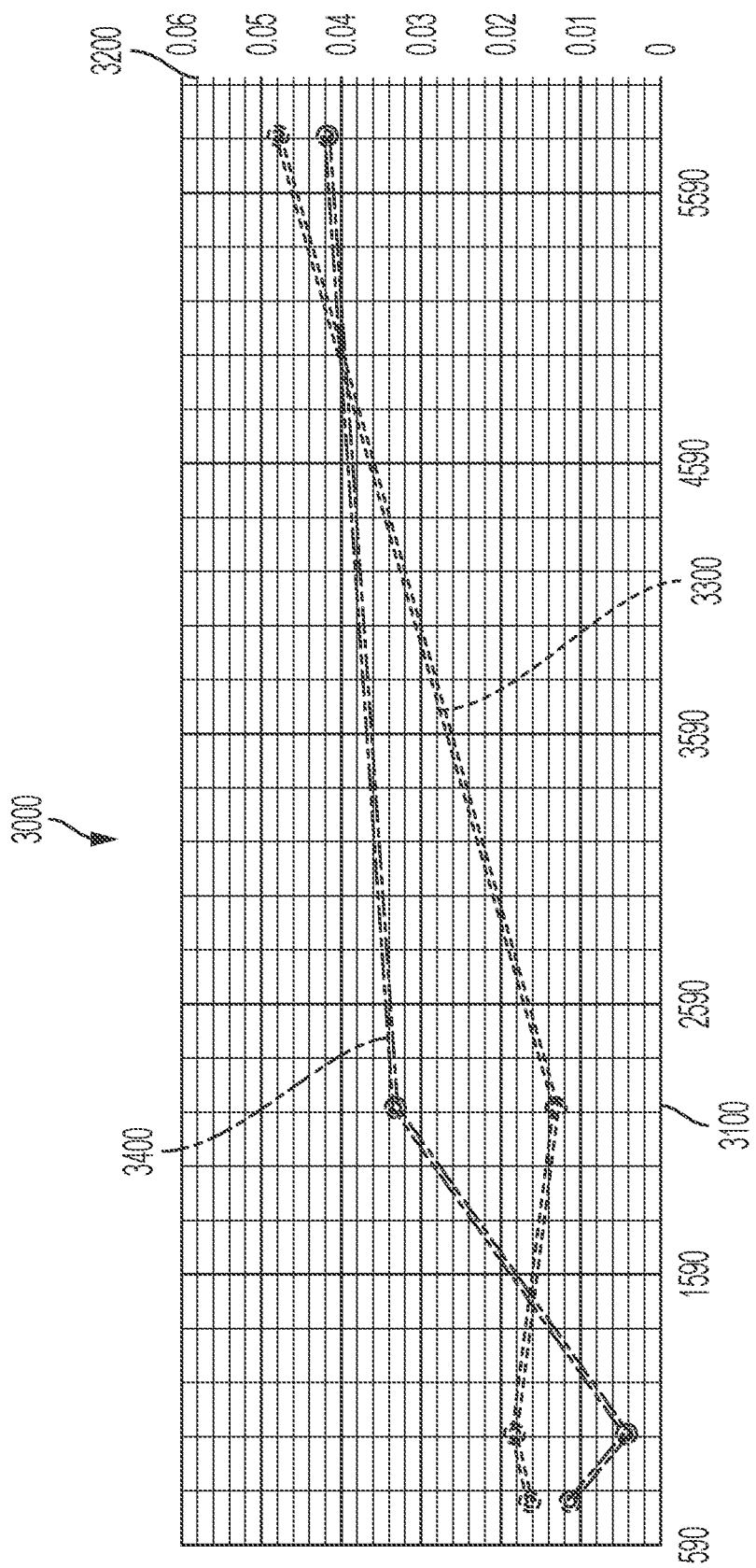
FIG. 3 is a graph of the comparison of performance of a straight antenna and an antenna configured according to some embodiments of the disclosure.

In addition to the permitting transmission and receipt of information when in a closed position or when using a chassis with a narrow border, a folded antenna like antenna 1500 provides superior performance relative to a non-folded or straight antenna at certain frequencies. For example, FIG. 3 shows a graph 3000 plotting the maximum differential between three different measurements (in decibels) on the Y-axis 3200 across various frequencies (in megahertz) on the X-axis 3100 of an antenna in a straight configuration (see line 3300) and the same antenna in a folded configuration (see line 3400). As shown in FIG. 3, the maximum differential, which reflects the efficiency of signal receipt, is greater for the folded antenna between frequencies of around 1400 MHz and around 5000 MHz. This range includes certain cell band frequencies (e.g., PCS and AWS band).

Figure 4A:
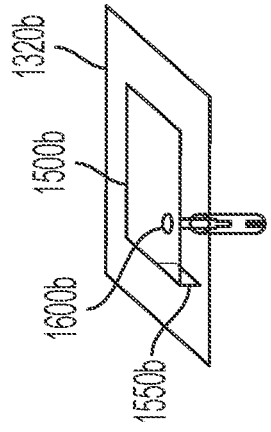
FIGS. 4A and 4B are cross-sectional perspective views of antennas and their electrical connection to an information handling system according to some embodiments of the disclosure.
Figure 4B:
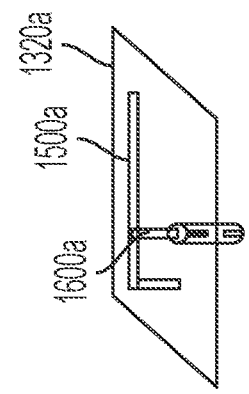
Figure 4E:
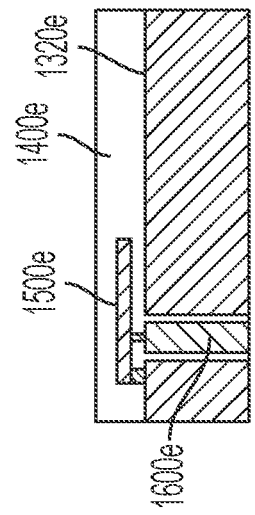
FIGS. 4C and 4E are cross-sectional side views of antennas and their electrical connection to an information handling system according to some embodiments of the disclosure.
Figure 4D:
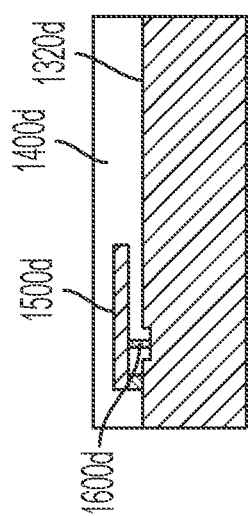
FIG. 4D is a side view of an antenna and its electrical connection to an information handling system according to some embodiments of the disclosure.
Figure 4C:
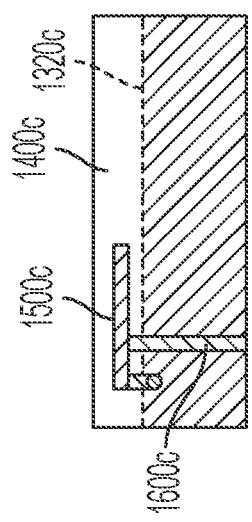

To facilitate transfer of information to and from antenna 1500, an electrical connection 1600, such as an electrically conductive wire (e.g., silver nanowire), may be coupled between components of IHS 1000 (such as a power supply or network card) and antenna 1500. More than one electrical connection 1600 may be used (e.g., one to a power supply and one to a network card) and each electrical connection 1600 may be positioned so that it does not interfere with electronic display 1314 or other components of IHS 1000. For example, electrical connection 1600 may be positioned through second side 1320, as shown in FIG. 2A. Such connection can be made in a variety of ways. As a first example, as shown in FIG. 4A, an antenna 1500*a* may be coupled to a second side 1320*a* of a display chassis and a wire connection 1600*a* (e.g., a feed line) may be drilled through the second side 1320*a* (which may function as a ground) to connect antenna 1500*a* to components of the associated IHS. As a second example, as shown in FIG. 4B, an antenna 1500*b* having a short circuit plate 1550*b* may be coupled to a second side 1320*b* of a display chassis and a wire connection 1600*b* (e.g., a feed line) may be drilled through the second side 1320*b* (which may function as a ground) to connect antenna 1500*b* to components of the associated IHS. As a third example, as shown in FIG. 4C, an antenna 1500*c* may be coupled (e.g., drilled partially into) to a second side 1320*c* of a display chassis and under a substrate 1400*c*, and a wire connection 1600*c* (e.g., a microstrip feed line) may be drilled through the second side 1320*c* (which may function as a ground) to connect antenna 1500*c* to components of the associated IHS. As a fourth example, as shown in FIG. 4D, an antenna 1500*d* may be coupled to a second side 1320*d* of a display chassis and under a substrate 1400*d*, and a wire connection 1600*d* (e.g., a normal feed line) may be drilled through the second side 1320*d* (which may function as a ground) to connect antenna 1500*d* to components of the associated IHS. As a fifth example, as shown in FIG. 4E, an antenna 1500e may be coupled to a second side 1320e of a display chassis and under a substrate 1400e, and a wire connection 1600e (e.g., a CPW feed line) may be drilled through the second side 1320e (which may function as a ground) to connect antenna 1500e to components of the associated IHS. In each of these examples, the second side of the display chassis may be drilled and/or the connection may be directly through the second side of the display chassis, which is not generally possible with a first side of a display chassis if that first side (as in FIG. 2A) has an electronic display (which may be made of, for example, glass and thereby create reliability issues). Similarly, it is not generally possible with a third side of a display chassis of that third side has an electronic display. Additionally, in each configuration, the antenna may include a radiating element on one side (e.g., the outside surface furthest away from the second side of the display chassis) and the connection on another side. This configuration results in minimized stress where the folded part of the antenna incorporates the connection.

Figure 5:
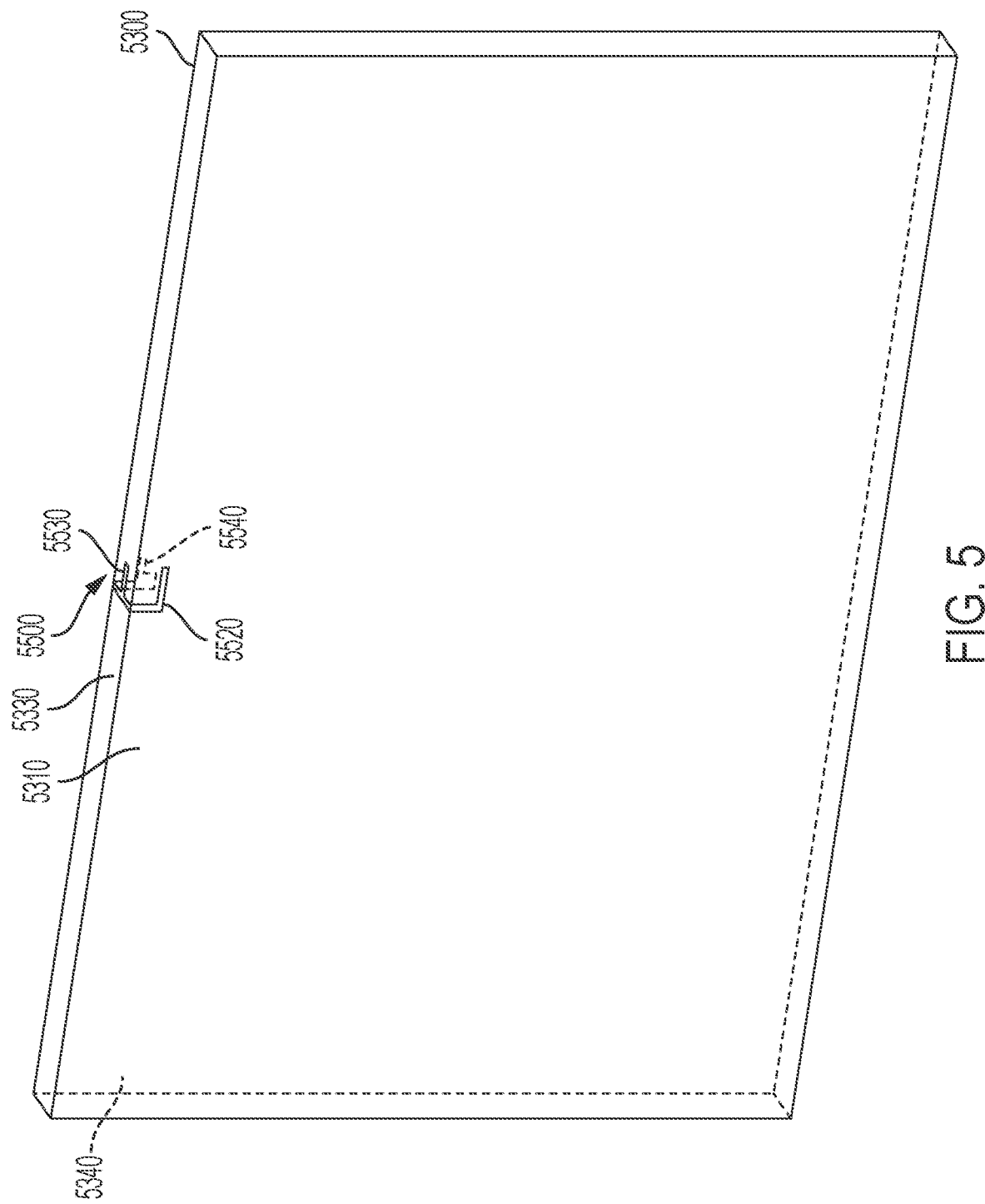
FIG. 5 is a perspective view of an antenna of an information handling system according to some embodiments of the disclosure.

Antenna 1500 may be any type of suitable antenna (e.g., that can be configured to have an omnidirectional or substantially omnidirectional radiation pattern), such as a F-antenna or di-pole antenna, and may be a unitary structure. For example, antenna 1500 may be an F-antenna with two or more branches. Each branch may extend in the same or in different directions from other branches and each may be on the same or different sides of display chassis 1300. For example, as shown in FIG. 5, a flexible F-antenna 5500 has a first branch 5520, second branch 5530, and third branch 5540 with first branch 5520 positioned on a first side 5310, second branch 5530 positioned on a second side 5330, and third branch 5540 positioned on a second side 5340, each of a display chassis 5300.

Figure 6:
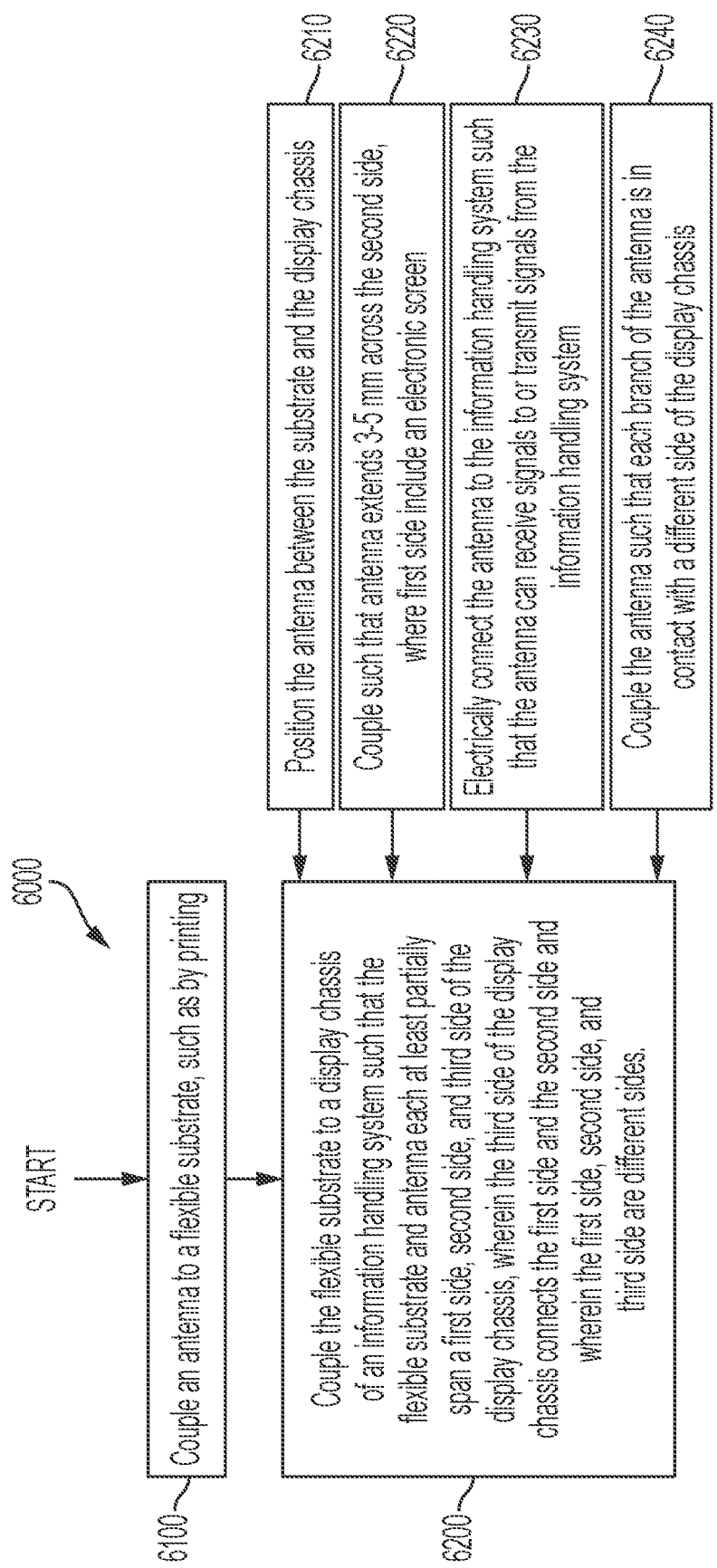
FIG. 6 is a flow chart illustrating a method of coupling an antenna to a display chassis according to some embodiments of the disclosure.

An antenna, such as antenna 1500 or antenna 5500, may be coupled to an IHS chassis, such as chassis 1100, using method 3000 shown in FIG. 6. First, at step 6100, an antenna, which may be the same or similar to antenna 1500 or antenna 5500, may be coupled to a flexible substrate, which may be the same or similar to substrate 1400. The antenna may be coupled by any suitable manner, including, for example, by screen printing. For example, the antenna may be created by printing with a conductive ink. Next, at step 6200, the flexible substrate is coupled to a display chassis of an information handling system such that the flexible substrate and antenna each at least partially span a first side, second side, and third side of the display chassis (where the referenced third side of the display chassis physically connects the first side and second side and where the first side, second side, and third side are all different sides of the display chassis). For example, the flexible substrate and antenna may be coupled to the display chassis so that they resemble the configuration of antenna 1500 and substrate 1400 shown in FIG. 2A. To facilitate such coupling, the antenna and substrate may be folded in the manner shown in FIG. 2A. Such folding may be accomplished by, for example, using tools such as a brake press and/or heat gun. For example, a brake press may be used to create an initial bend in the substrate and then a heat gun may be used to complete the bend (e.g., by heating the substrate and antenna to around 185 degrees Celsius). Step 6200 may also include additional and optional sub-steps 6210, 6220, 6230 and/or 6240. At substep 6210, the antenna is positioned between the substrate and the display chassis when the substrate is coupled to the display chassis. At substep 6220, the antenna is coupled to the display chassis (with the substrate) such that the antenna extends between 3 mm and 5 mm across the second side of the display chassis, wherein the first side includes an electronic display (e.g., but the second side does not). At substep 6230, the substrate is coupled to the display chassis such that an electrical connection is made between the antenna and the IHS of the display chassis such that the antenna can receive signals to or transmit signals from such IHS. At substep 6240, the antenna is an F-antenna with multiple (e.g., three) branches and each branch is in contact with a different side of the first side, second side, and third side, of the display chassis (though all or more than one branch could alternatively be positioned on the same side of the display chassis).

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus comprising:
an antenna configured to be positioned across at least some portion of each of a first side, second side, and third side of a display chassis of an information handling system, wherein the antenna is a F-antenna having substantially all of a first branch positioned on the second side of the display chassis, and substantially all of a second branch positioned on the third side of the display chassis,
wherein the third side of the display chassis connects the first side and second side, wherein the first side, second side, and third side are different sides, and wherein the antenna is configured to receive signals for or transmit signals from the information handling system; and
a flexible substrate positioned across at least some portion of each of the first side, second side, and third side of the display chassis, the flexible substrate configured to couple the antenna to the display chassis, wherein the first side of the display chassis includes an electronic display, and wherein the flexible substrate covers substantially all of the electronic display.

2. The apparatus of claim 1, wherein, when the antenna is positioned across at least some portion of each of the first side, second side, and third side of the display chassis, the antenna extends between 3 and 5 mm across the second side.

3. The apparatus of claim 1, wherein the antenna has a third branch positioned on the first side of the display chassis.

4. An information handling system comprising:
a display chassis having a first side, second side, and third side connecting the first side and second side;
an antenna positioned across at least some portion of each of the first side, second side, and third side of the display chassis, the antenna being configured to receive signals for or transmit signals from the information handling system, wherein the antenna is a F-antenna having substantially all of a first branch positioned on the second side of the display chassis, and substantially all of a second branch positioned on the third side of the display chassis; and a flexible substrate positioned across at least some portion of each of the first side, second side, and third side of the display chassis, the flexible substrate configured to couple the antenna to the display chassis, wherein the first side of the display chassis includes an electronic display, and wherein the flexible substrate covers substantially all of the electronic display;

wherein the first side, second side, and third side are different sides.

5. The system of claim 4, wherein the antenna is printed onto the flexible substrate.

6. The system of claim 4, wherein the antenna is an integral structure.

7. The system of claim 4, wherein the flexible substrate is made of plastic.

8. The system of claim 4, where in the antenna is positioned between the flexible substrate and the display chassis.

9. The system of claim 4, wherein the antenna extends between 3 and 5 mm across the second side, wherein the first side of the display chassis includes an opening for an electronic display.

10. The system of claim 4, further comprising an electrical connection between the antenna and a power supply of the information handling system through the second or third side of the display chassis.

11. The system of claim 10, further comprising a second electrical connection between the antenna and a network card to receive signals to or transmit signals from the information handling system.

12. The system of claim 10, wherein the antenna has a third branch positioned on the first side of the display chassis.

13. A method comprising:
coupling an antenna to a flexible substrate, wherein the antenna is a F-antenna; and
coupling the flexible substrate to a display chassis of an information handling system such that the flexible substrate and antenna each at least partially span a first side, second side, and third side of the display chassis, wherein the third side of the display chassis connects the first side and the second side, wherein the first side, second side and third side are different sides, and wherein the F-antenna has substantially all of a first branch positioned on the second side of the display chassis, and substantially all of a second branch positioned on the third side of the display chassis; and
wherein the first side of the display chassis includes an electronic display, and wherein the flexible substrate covers substantially all of the electronic display.

14. The method of claim 13, further comprising printing the antenna onto the flexible substrate.

15. The method of claim 13, further comprising positioning the antenna between the flexible substrate and the display chassis.

16. The method of claim 13, further comprising coupling the antenna to a display chassis of the information handling system such that the antenna extends between 3 and 5 mm across the second side, where the first side of the display chassis includes an electronic display.

17. The method of claim 13, further comprising electrically connecting the antenna to the information handling system such that the antenna can receive signals to or transmit signals from the information handling system.

18. The method of claim 17, further comprising electrically connecting the antenna to the information handling system by an electric connection through the second or third side of the display chassis.

\* \* \* \* \*